United States Patent [19]
Rokutan

[11] Patent Number: 6,034,933
[45] Date of Patent: Mar. 7, 2000

[54] APPARATUS FOR RECORDING AND REPRODUCING OPTICAL INFORMATION ON AND FROM OPTICAL RECORD MEDIUM

[75] Inventor: Takao Rokutan, Higashimurayama, Japan

[73] Assignee: Olympus Optical Company, Ltd., Tokyo, Japan

[21] Appl. No.: 08/982,470

[22] Filed: Dec. 2, 1997

[30] Foreign Application Priority Data

Dec. 3, 1996 [JP] Japan ..................... 8-322508

[51] Int. Cl.⁷ ........................................ G11B 7/00
[52] U.S. Cl. .................................................. 369/54
[58] Field of Search .................. 369/54; 235/454, 235/456

[56] References Cited

U.S. PATENT DOCUMENTS

| 5,719,839 | 2/1998 | Naito | 369/54 |
| 5,808,991 | 9/1998 | Inoue | 369/54 |

FOREIGN PATENT DOCUMENTS 8-255346  10/1996  Japan .

Primary Examiner—W. R. Young
Attorney, Agent, or Firm—Stevens, Davis, Miller & Mosher, L.L.P.

[57] ABSTRACT

An apparatus for recording and reproducing optical information on and from an optical record medium such as optical card including an optical device having semiconductor lasers 1, 2, diffraction gratings 6, 10a, 10b and objective lens 3 for projecting a recording light beam, two verifying light beams and plural reproducing light beams onto plural adjacent tracks on the optical card 4, and a photo-detector 16 having two verifying light receiving sections 27c and 27e which receive the verifying light beams reflected by the optical card and at least one leak light receiving section 28 which receives only the undesired recording light beams reflected from the optical card 4. Output signals from the verifying light receiving sections 27c and 27e are corrected by an output signal from the leak light receiving section 28. The recorded information can be verified accurately in accordance with either one of the corrected output signals from the verifying light receiving sections 27c and 27e depending upon a moving direction of the optical card with respect to the light spots.

21 Claims, 13 Drawing Sheets

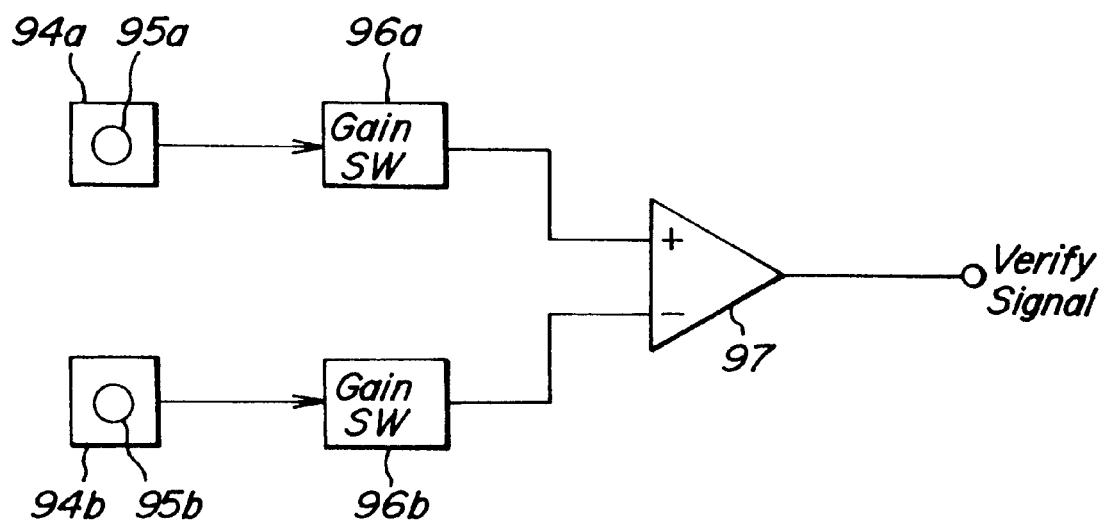
FIG_2
PRIOR ART

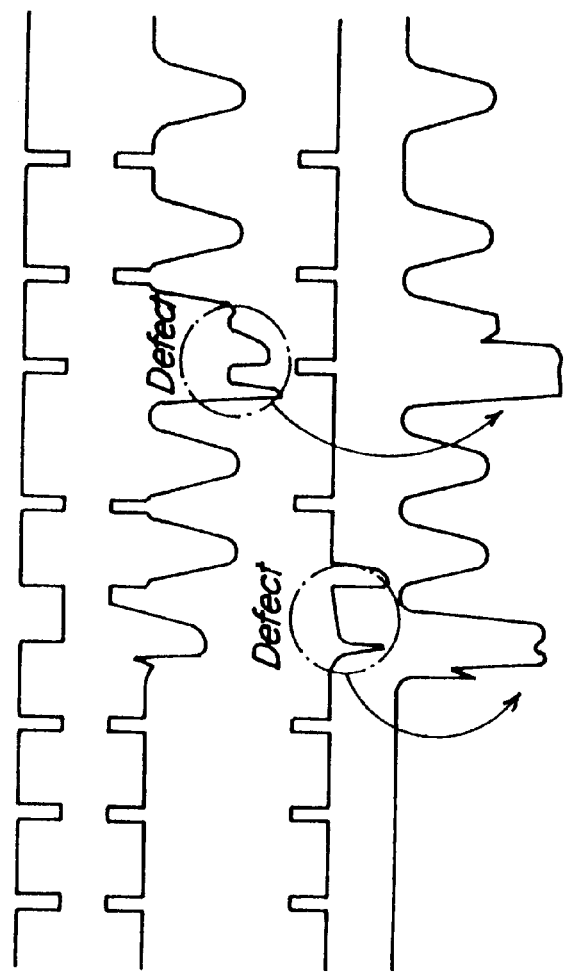

FIG._4
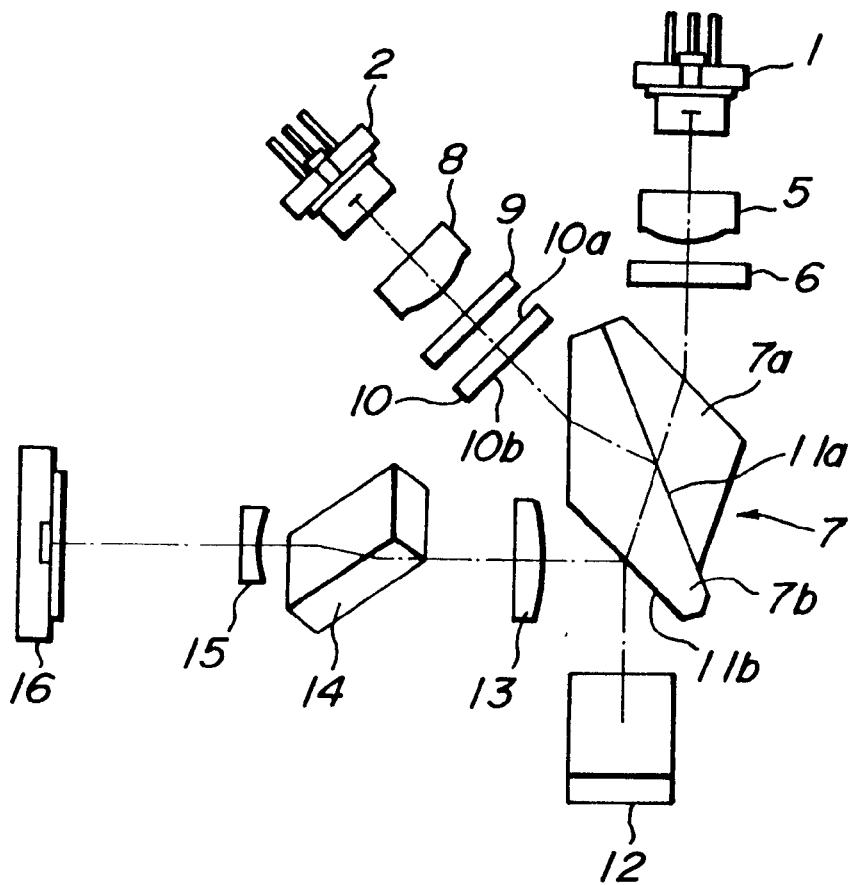
FIG._5
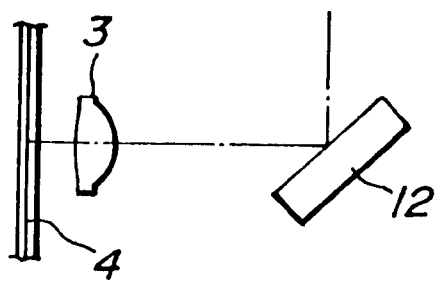

FIG_8

FIG_13
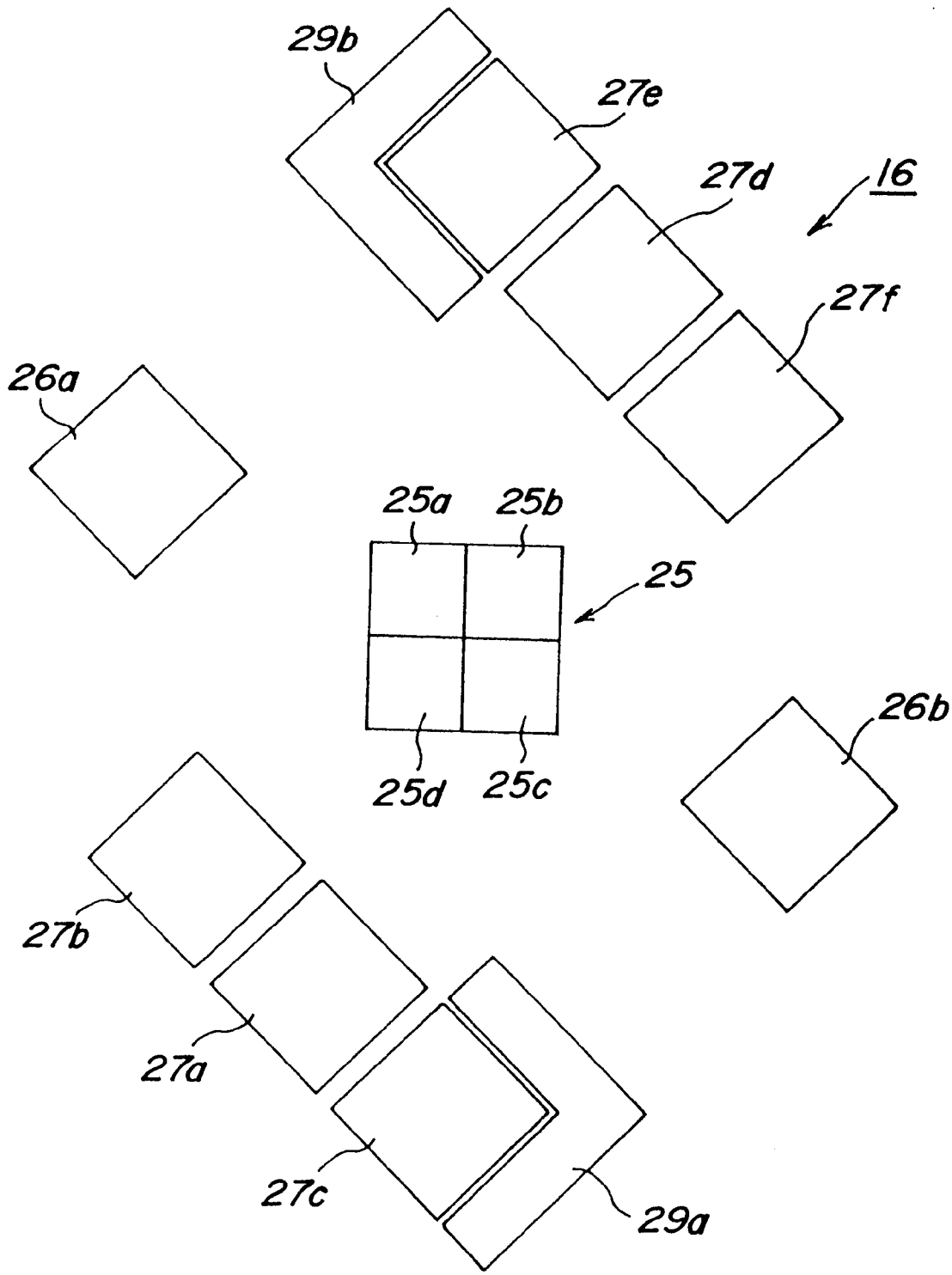

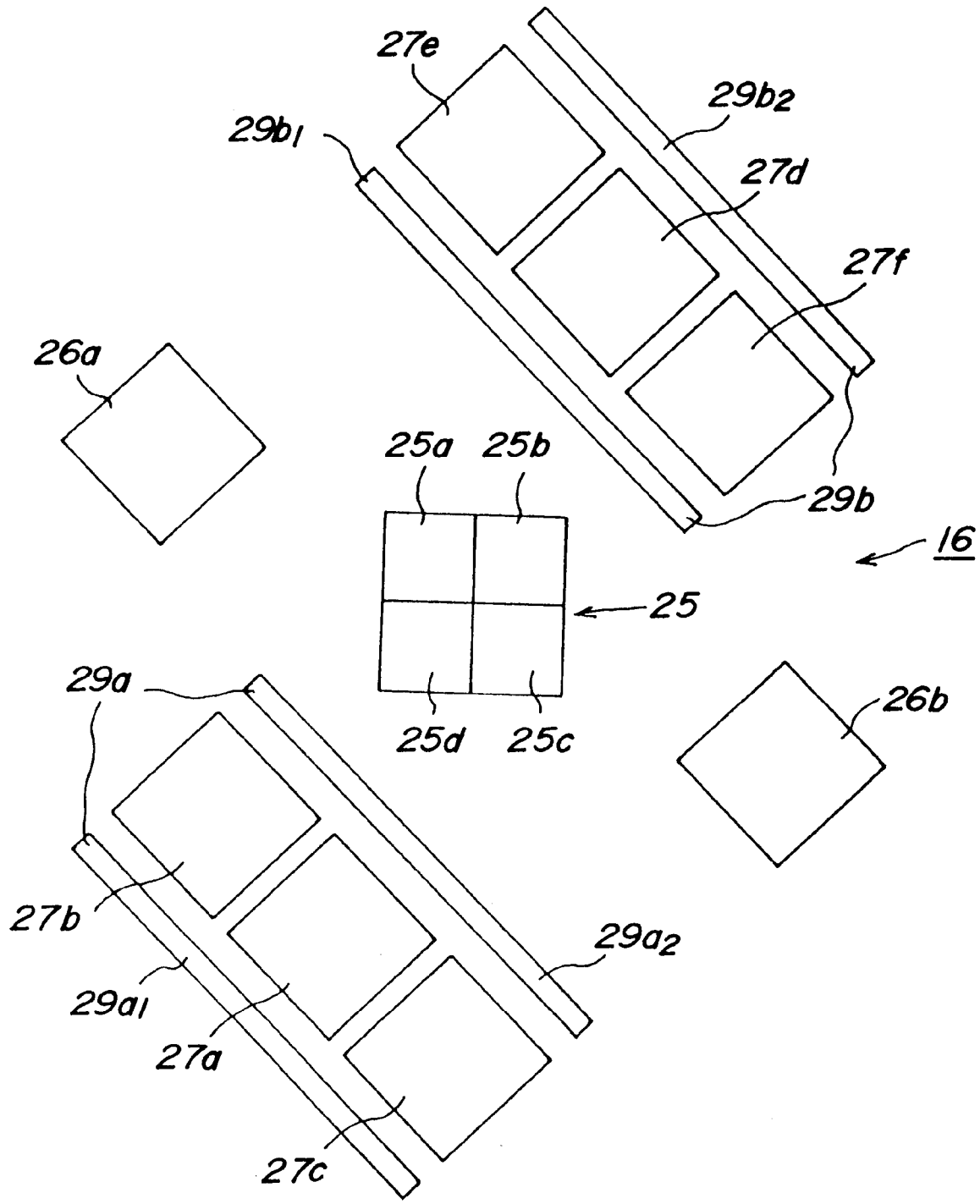
FIG_14

APPARATUS FOR RECORDING AND REPRODUCING OPTICAL INFORMATION ON AND FROM OPTICAL RECORD MEDIUM

BACKGROUND OF THE INVENTION

1. Field of the Invention

The present invention relates to an apparatus for recording and reproducing optical information on and from an optical record medium such as optical card and optical disc, in which the optical information is recorded on the optical record medium, while the just recorded optical information is verified.

2. Related Art Statement

In the optical information recording and reproducing apparatus of the kind mentioned above, in order to verify the recording operation by a recording light beam, a verifying light beam is made incident upon the optical record medium in addition to the recording light beam and a verifying light receiving element is provided for receiving the verifying light beam reflected by the optical record medium. In an apparatus for recording and reproducing optical information on and from an optical card, the optical card is moved with respect to light spots in a reciprocal manner in a direction of a track on the optical card. Therefore, in order to perform the verifying operation during the forward movement as well as the backward movement of the optical card with respect to the recording light beam, two verifying light beams are made incident upon the optical card such that the recording light beam spot on the optical card situates at a middle point between the two verifying light beam spots viewed in the direction of the track on the optical card.

During the recording mode, a power of the recording light beam is changed from a lower reproducing level to a higher recording level, and the recording light beam having the higher power is reflected by the optical record medium and is made incident upon the verifying light receiving elements. In this manner, the verifying operation is affected by the leakage of the recording light beam and could not be carried out correctly. In order to remove such an influence of the leakage of the recording light beam reflected by the optical record medium onto the verifying light receiving elements, it has been proposed to produce a verify signal by deriving a difference between two output signals from the verifying light receiving elements. In the verify signal, the influences of the leakage of the recording light beam upon the two verifying light receiving elements are cancelled out.

Such an optical information recording and reproducing apparatus has been known from, for instance Japanese Patent Laid-open Publication Kokai Hei 8-255346. In this known optical information recording and reproducing apparatus, as illustrated in FIG. 1, a recording light beam and two verifying light beams are projected on an optical card 4 to form a recording light spot 92 and two verifying light spots 93a and 93b on a same track 91a of the optical card such that the recording light spot 92 situates at a middle position between the verifying light spots 93a and 93b. The optical card 4 is moved reciprocally in a direction of the track with respect to the light spots 92 and 93a, 93b, and the optical information is recorded on the optical card 91 by modulating the intensity of the recording light spot 92 in accordance with the optical information.

In FIG. 1, the optical card 1 is moved downward relative to the light spots 92 and 93a, 93b, so that the verifying light spot 93a is formed on a blank portion of the track 91a where no information has been recorded. When the optical card 4 is moved upward, then the verifying light spot 93b is made incident upon the blank portion of the track. The verifying light spots 93a and 93b are reflected by the optical card 91 and are made incident upon light receiving elements 94a and 94b as spots 95a and 95b, respectively as shown in FIG. 2. Output signals from the light receiving elements 94a and 94b are amplified by gain switching circuits (Gain SW) 96a and 96b, respectively. It should be noted that the verifying light beams are emitted from the same light source from which the recording light beam is emitted and are subjected to the modulation in accordance with a write signal to be recorded on the optical card. In order to compensate for such modulation in the verifying light beams, the gain of these circuits 96a and 96b is controlled or switched in accordance with the modulation of the recording light spot 92. Then, the amplified signals from the gain switching circuits 96a and 96b are supplied to a subtracting circuit 97 to derive a difference signal. This difference signal supplied from the subtracting circuit 97 provides a verify signal for verifying the information just recorded by the recording light spot 92.

In the known optical information recording and reproducing apparatus, the verifying light spots 93a and 93b are formed on the optical card 91 on opposite sides of the recording light spot 92 viewed in the direction of the information track 91a, the verifying light beams reflected by the optical card 91 are separately received by the light receiving elements 94a and 94b, and the difference between the output signals of these light receiving elements is derived to produce the verify signal. In this manner, signal components due to the leakage of the recording light spot 92 having a higher power onto the verifying light receiving elements 94a and 94b can be cancelled out.

In the known optical information recording and reproducing apparatus, when a defect 98 is existent on the track 91a of the optical card 91 as depicted in FIG. 1, the defect passes through the verifying light spots 93a and 93b at different time instances. That is to say, the defect 98 is first detected by the verifying light spot 93a, and then after a time interval during which the optical card 91 is moved over a distance between the verifying light spots 93a and 93b, the defect is detected again by the verifying light spot 93b. This is represented in FIGS. 3A–3D, in which FIG. 3A shows the write signal to be recorded on the optical card 91, FIGS. 3B and 3C represent the output signals of the gain switching circuits 96a and 96b, respectively, and FIG. 3D depicts the output signal of the subtracting circuit 97. The influence of the defect 98 appears in the output signals of the gain switching circuits 96a and 96b at different timings, and therefore the output signal, i.e. the verify signal includes the influence of the defect 98 twice and the verifying operation could not be performed correctly.

Moreover, as illustrated in FIG. 1, since the two verifying light spots 93a and 93b are positioned on opposite sides of the recording light spot 92 viewed in the track direction, the distance between the verifying light spots 93a and 93b is liable to be relatively larger. Therefore, if the recording light beam is reflected by the optical card in a non-uniform manner, the reflected recording light beam received by one of the verifying light receiving elements 94a and 94b becomes different from that received by the other of the elements 94a and 94b. This results in that the influence of the leakage of the recording light beam onto the verifying light receiving elements 94a and 94b could not be removed effectively.

SUMMARY OF THE INVENTION

The present invention has for its object to provide a novel and useful apparatus for recording and reproducing optical information on an optical record medium, in which recorded information can be verified correctly without increasing an error rate due to defects on the optical record medium.

According to the invention, an apparatus for recording and reproducing optical information on and from an optical record medium of a multi-layer structure comprises:

a light beam projection means for projecting a recording light beam and at least one verifying light beam onto the optical record medium to form a recording light spot and at least one verifying light spot on the optical record medium;

a photo-detecting means including at least one verifying light receiving section for receiving the verifying light beam reflected by the optical record medium and at least one leak light receiving section for receiving only undesired recording light beams reflected from the optical record medium; and a signal processing means for correcting an output signal from said verifying light receiving section on the basis of an output signal from said leak light receiving section.

According to the invention, it is preferable to provide said leak light receiving section in the vicinity of the verifying light receiving section. In this case, although the recording light beams are reflected by the optical record medium in a non-uniform manner, the recorded information can be accurately verified.

In a preferable embodiment of the optical information recording and reproducing apparatus according to the invention, said light beam projection means further projects at least one reproducing light beam onto a track adjacent to the track on which the recording light beam is made incident, said photo-detecting means further includes at least one reproducing light receiving section for receiving said at least one reproducing light beam reflected by the optical record medium, and said signal processing means is constructed to correct an output signal from the reproducing light receiving section on the basis of the output signal from the leak light receiving section. In such an embodiment, the reproduced signal generated by the reproducing light receiving section is used to check a blank condition of the track upon which the reproducing light beam is made incident, and the output signal from the reproducing light receiving section can be corrected by the output signal of the leak light receiving section. Then, the operation for checking the blank condition can be performed much more correctly and an effective recording speed can be increased.

According to the invention, it is preferable to form the verifying light receiving section and reproducing light receiving section on a single semiconductor substrate together with for light receiving sections for deriving the focusing and tracking error signals.

BRIEF DESCRIPTION OF THE DRAWINGS

FIG. 2 is a block diagram depicting a signal processing circuit of the known apparatus shown in FIG. 1;

FIGS. 3A to 3D are signal waveforms explaining the operation of the signal processing circuit of FIG. 2;

FIG. 4 is a plan view illustrating a first embodiment of the optical information recording and reproducing apparatus according to the invention;

FIG. 5 is a side view showing a part of the apparatus of FIG. 4;

FIG. 13 is plan view depicting a modified embodiment of the light detector usable in the second and third embodiments; and FIG. 14 is a plan view showing another embodiment of the light detector according to the invention.

DETAILED EXPLANATION OF THE INVENTION

Figure 1:
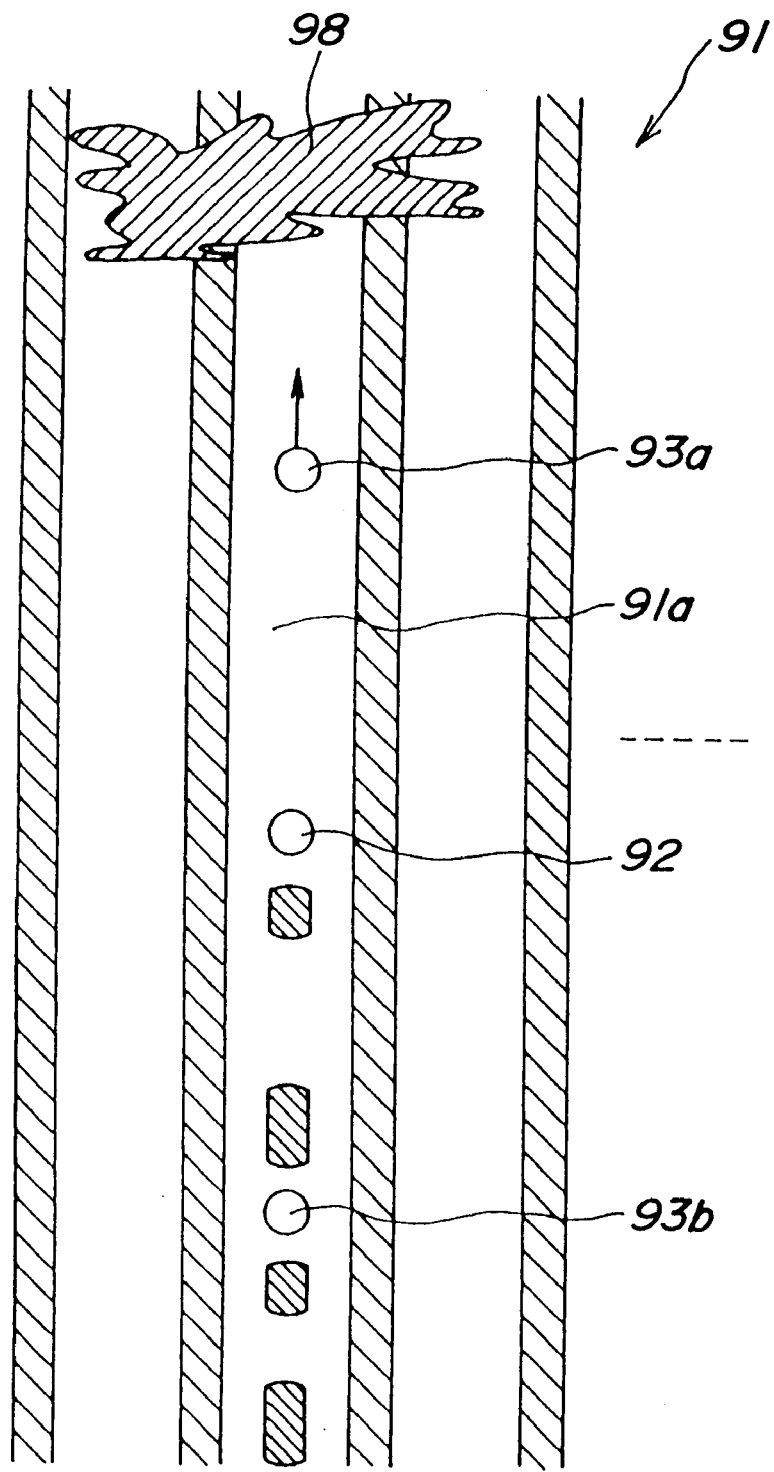
FIG. 1 is a schematic view showing a known optical information recording and reproducing apparatus.

FIG. 4 is a plan view showing a first embodiment of the optical information recording and reproducing apparatus according to the invention, and FIG. 5 is a cross sectional view illustrating a part thereof. The apparatus comprises a recording semiconductor laser 1 and a reproducing semiconductor laser 2. Laser beams emitted by these semiconductor lasers 1 and 2 are projected onto an optical card 4 by means of a common objective lens 3. The optical information is recorded and reproduced on and from the optical card 4, while the tracking control and focusing control are carried out by means of the laser beams emitted by the semiconductor lasers 1 and 2.

The light beam emitted by the semiconductor laser 1 is converted by a collimator lens 5 into a parallel beam, and then the parallel beam is made incident upon a diffraction grating 6. From the diffraction grating 6, a zero-order beam (recording light beam) and ±1-order light beams (tracking light beams) are obtained. These three light beams are then made incident upon a prism member 7.

The light beam emitted by the semiconductor laser 2 is linearly polarized in a direction parallel with a plane of the drawing of FIG. 4 and is converted by a collimator lens 8 into a parallel light beam, which is made incident upon a diffractive optical member 10 via a ½ wavelength plate 9 in which the polarized direction of the laser beam is rotated by 90 degrees. The diffractive optical member 10 comprises different diffractive gratings 10*a* and 10*b* formed on opposite surfaces of a glass substrate plate. In the diffractive grating 10*a*, ±1-order light beams are obtained, and each of these two light beams is further divided into 0-order light beam and ±1-order light beams. In this manner, six light beams emanate from the diffractive optical element 10.

The prism member 7 has a function to combine the light beams originated from the semiconductor laser 1 with the light beams originated from the semiconductor laser 2 and a function to separate an incident light path from an exit light path. The prism member 7 comprises a first prism 7*a* having an incident surface for the light beam from the semiconductor laser 1, a second prism 7*b* having an incident surface for the light beam from the semiconductor laser 2, a first polarizing film 11*a* provided at a boundary surface between the first and second prisms 7*a* and 7*b* for combining the light beams, and a second polarizing film 11b formed on a surface of the second prism 7b for separating the incident and exit optical paths from each other. The first polarizing film 11a has a transmission Tp of 100% for the P-polarized light and a reflection Rs of 100% for the S-polarized light. The second polarizing film 11b has Tp=70% and Rs=60%.

The light beams originated from the semiconductor laser 1 and emanating from the diffraction grating 6 are made incident upon the first polarizing film 11a as the P-polarized light and are transmitted therethrough. The light beams originated from the semiconductor laser 2 and emanating from the diffractive optical member 10 are transmitted through the second prism 7b and are made incident upon the first polarizing film 11a as the S-polarized light and are reflected thereby. In this manner, the light beams from the semiconductor lasers 1 and 2 are combined by the first polarizing film 11a in such a manner that these light beams propagate along substantially identical optical paths, and the thus combined light beams emanate from the second polarizing film 11b.

In the present embodiment, in order to avoid a variation in wavelength of the light beams emitted by the semiconductor lasers 1 and 2, particularly a variation in wavelength of the light beam emitted by the semiconductor laser 1 due to a fact that this light beam is modulated between the higher recording power level and the lower reproducing power level, and to avoid a relative positional shift between light spots of the light beams emitted by the semiconductor lasers 1 and 2 and projected onto the optical card 4 due to a variation in a ratio of refractive index between the prism member 7 and the air due to a variation of an ambient temperature, the light beams emanating from the diffraction grating 6 and diffractive optical member 10 are not subjected to the beam shaping in the prism member 7. To this end, the prism member 7 is constructed such that the incident surface and exit surface are brought in parallel with each other in a development in which an optical path within the prism member becomes rectilinear.

The light beams emanating from the second polarizing film 11b of the prism member 7 are reflected by an upright mirror 12 toward a direction perpendicular to a plane of the drawing of FIG. 4. As shown in FIG. 5, the light beams are made incident upon the optical card 4 by means of the objective lens 3.

The light beams reflected by the optical card 4 are reflected by the upright mirror 12 and are made incident upon the second polarizing film 11b of the prism member 7. The light beams are then reflected by the second polarizing film 11b and are made incident upon a plane parallel plate 14 via a collimator lens 13 as converging light beams. The plane parallel plate 14 is arranged to be inclined with respect to the optical axis by 45° (inclined with respect to the track also by 45°). The light beams are refracted by and transmitted through the plate 14 and are subjected to the astigmatism by means of which the focus error can be detected. The light beams emanating from the plane parallel plate 14 are made incident upon a photo-detector 16 via a concave lens 15.

Figure 6:
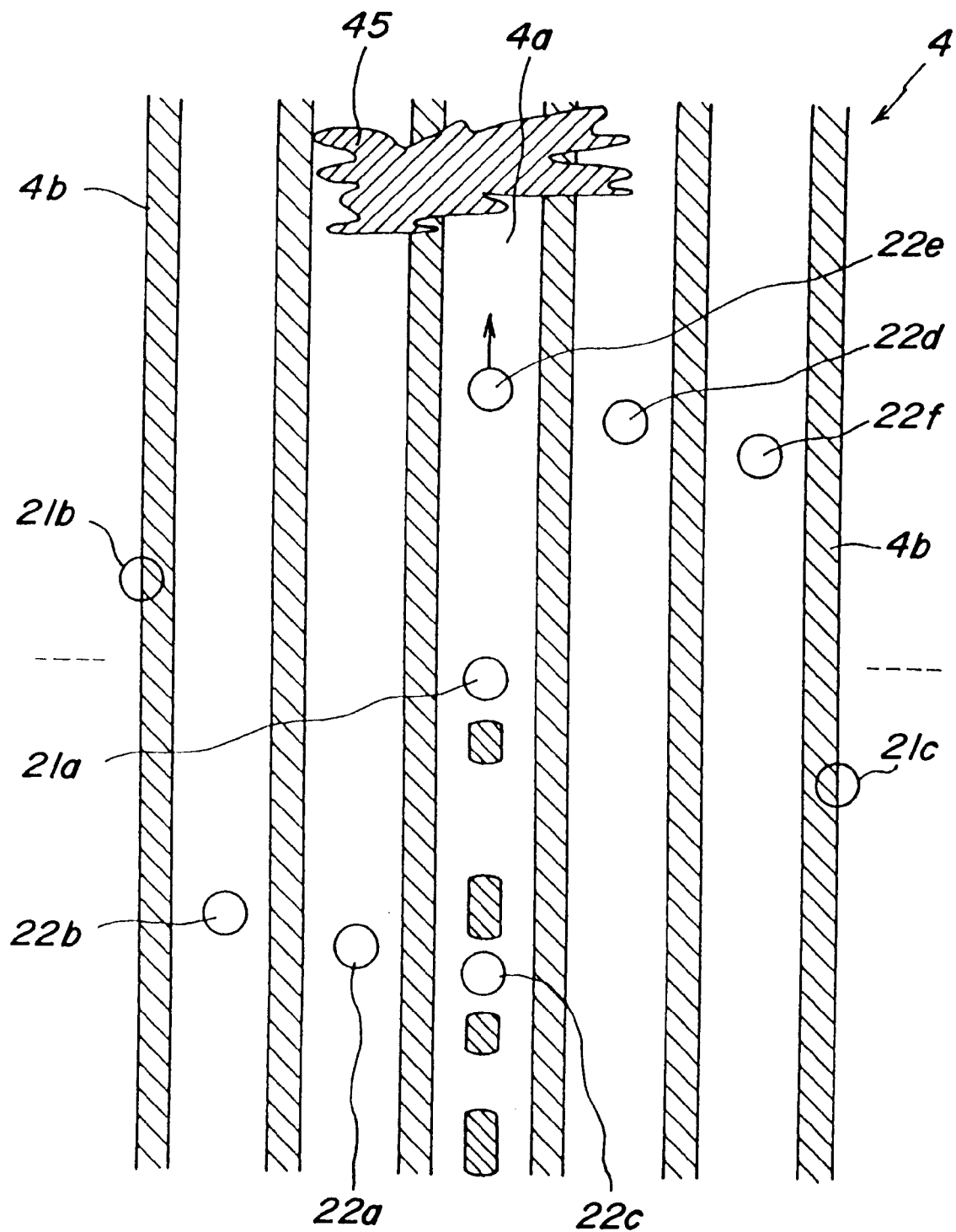
FIG. 6 is a schematic view depicting a relative position between light spots and tracks on an optical card.

FIG. 6 is a schematic plan view showing a positional relationship between tracks on the optical card 4 and light spots formed by the light beams originated from the semiconductor lasers 1 and 2. In FIG. 6, light spots 21a–21c are formed by the three light beams originated from the semiconductor laser 1 and emanating from the diffraction grating 6. That is to say, the light spot 21a is formed by the 0-order light beam emanating from the diffraction grating 6, and the light spots 21b and 21c are formed by the ±1-order light beams, respectively emanating from the diffraction grating 6.

Light spots 22a–22f are formed by the light beams originated from the semiconductor laser 2 and emanating from the diffractive optical member 10. The light spots 22a–22c are formed by the 0-order light beam and ±1-order light beams obtained by dividing the +1-order light beam emanating from the diffraction grating 10a by the diffraction grating 10b, and the light spots 22d–22f are formed by the 0-order light beam and ±1-order light beams which are obtained by dividing the −1-order light beam emanating from the diffraction grating 10a by the diffraction grating 10b. That is to say, the light spots 22a and 22d are formed by the 0-order light beams emanating from the diffraction grating 10b, the light spots 22b and 22e are formed by the +1-order light beams emanating from the diffraction grating 10b, and the light spots 22c and 22f are formed by the −1-order light beams emanating from the diffraction grating 10b.

The light spots 21a–21c are positioned such that when the light spot 21a is projected on a desired track 4a, the light spots 21b and 21c are projected onto opposite edges of guide tracks 4b which are separated from the desired track 4a by several tracks.

The light spots 22a–22c formed by the light beam emitted by the semiconductor laser 2 are projected on successive three tracks including the track 4a on which the light spot 21a is formed and the light spots 22d–22f are projected on successive three tracks also including the track 4a, but situating on the opposite side to that on which said light spots 22a–22c are projected. Therefore, both the light spots 22c and 22e are projected on the same track 4a.

In this manner, in the information recording mode, the semiconductor laser 1 emits the laser beam whose intensity is modulated between the lower reproducing power level and the higher recording power level in accordance with the information to be recorded, and the semiconductor laser 2 emits the laser beam having a given reproducing power level. The tracking control is carried out by receiving the return light beams of the light spots 21b and 21c from the optical card 4, and the information is recorded on the desired track 4a by means of the light spot 21a. The recorded information is verified by processing either one of output signals from light receiving sections receiving the return light beams of the light spots 22c and 22e. That is to say, when the optical card 4 is moved upward with respect to the light spots, the light spot 22c is used to verify the recorded information, and when the optical card is moved downward, the light spot 22e is used to perform the verify operation.

In the information reproducing mode, the laser beams having the reproducing power level are emitted from the semiconductor lasers 1 and 2, the information is read out of five adjacent tracks simultaneously by using the light spots 22a–22c and 22d–22f, while the tracking control is carried out by using the light spots 21b and 21c. In this manner, a so-called multi-track read can be performed. It should be noted that since the light spots 22c and 22e are projected on the same track 4a, either one of them is used to reproduce the information recorded on the relevant track.

Figure 7:
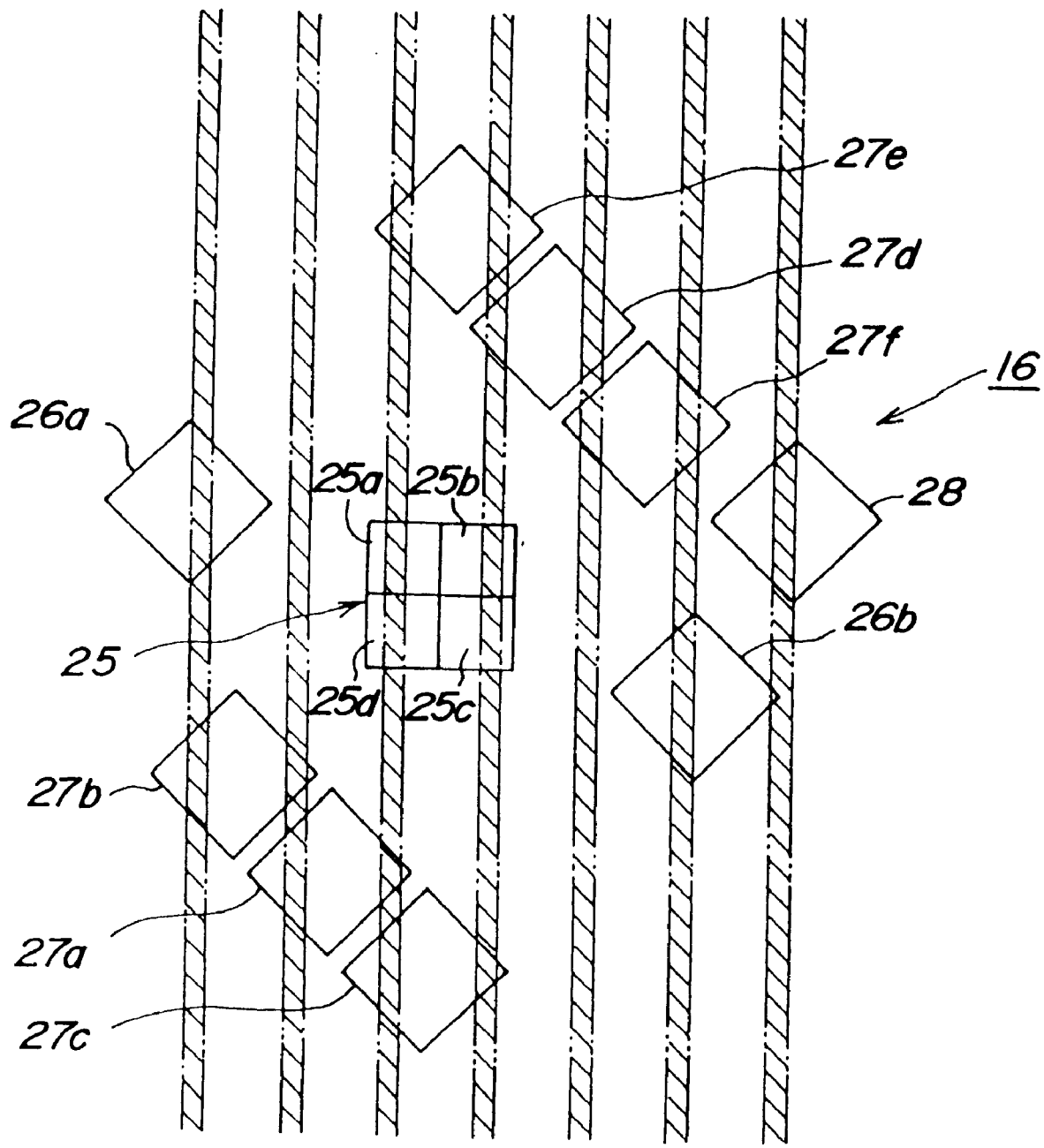
FIG. 7 is a plan view showing the arrangement of light receiving regions of the light detector shown in FIG. 4.

FIG. 7 is a schematic plan view illustrating the construction of the photo-detector 16 shown in FIG. 4. The photo-detector 16 includes a light receiving section 25 receiving the return light beam from the light spot 21a, light receiving sections 26a and 26b receiving the return light beams from the light spots 21b and 21c, respectively, light receiving sections 27a-27c receiving the return light beams from the light spots 22a–22c, respectively, light receiving sections 27d–27f receiving the return light beams from the light spots 22d–22f, respectively, and a leak light receiving section 28. These light receiving sections are integrally formed on a same semiconductor substrate. It should be noted that the light receiving section 25 is formed by four divided light receiving regions 25a–25d.

Figure 8:
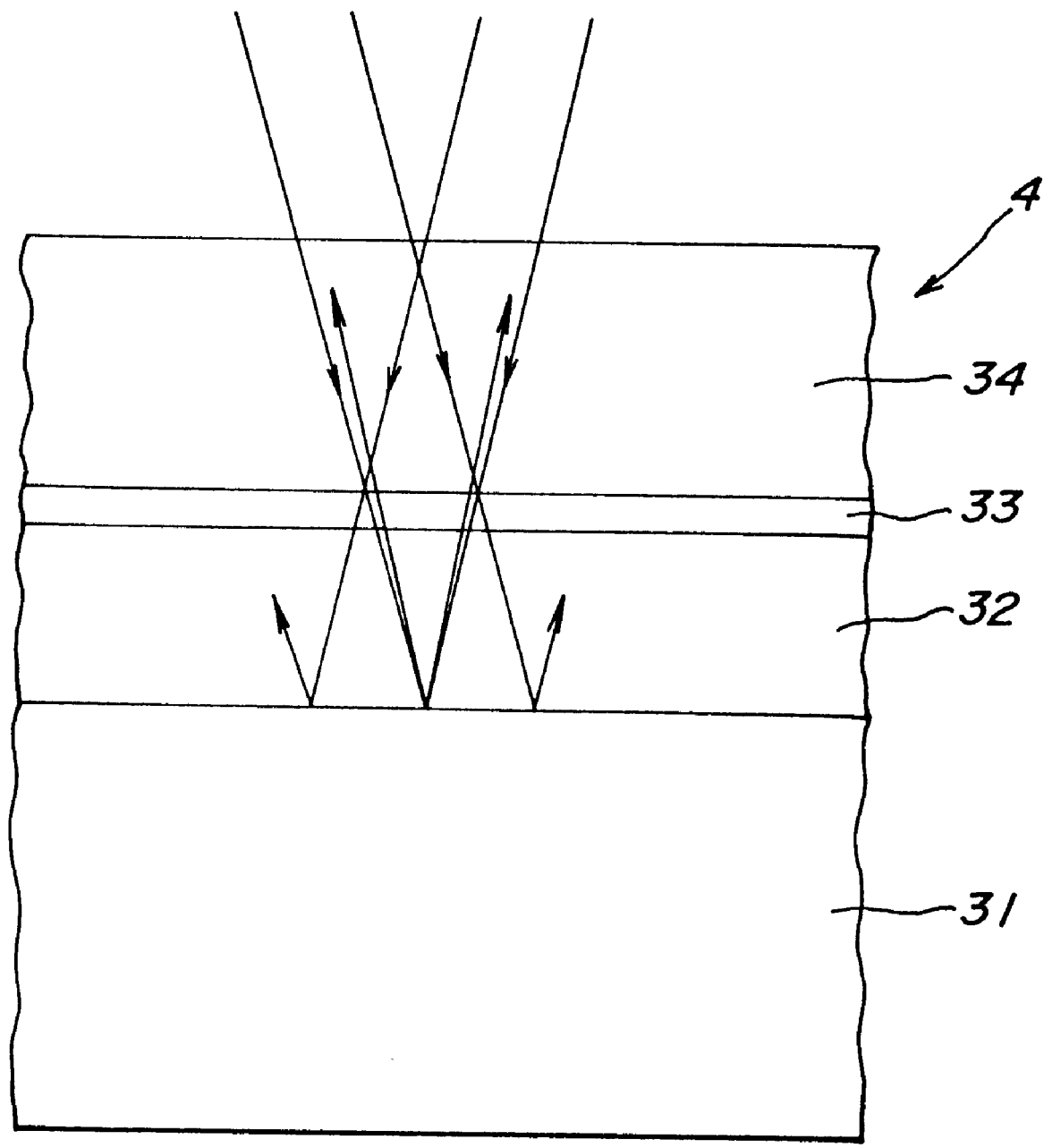
FIG. 8 is a cross sectional view illustrating an embodiment of the optical card.

The leak light receiving section 28 is formed at such a position that the reflected light beams of the light spots including the recording light spot 21a, tracking light spots 21b, 21c and reproducing light spots 22a–22f are not made incident upon the leak light receiving section 28. That is to say, the leak light receiving section 28 receives undesired return light beams produced by the reflection of the recording light spot 21a from surfaces other than a record layer of the optical card 4 during the recording mode. The recording power level of the recording light spot 21a is higher than the reproducing power level by ten and several times, and the optical card 4 is constructed by stacking, on a substrate 31 made of resin, an adhesive layer 32, a record layer 33 and a transparent film 34 as depicted in FIG. 8. Then, the recording light beam which is focused on the record layer 33 is reflected by a surface of the transparent film 34 as well as by a boundary surface between the adhesive layer 32 and the substrate 31 to produce undesired return beams. These undesired recording light beams are leaked onto not only the light receiving sections 27c and 27e but also the leak light receiving section 28.

In the present embodiment, the leak light receiving section 28 is provided to receive only the undesired light beams reflected by the optical card 4 due to the recording light spot 21a having the higher power, and output signals from the light receiving sections 27c, 27e are corrected on the basis of an output signal from the leak light receiving section 28 as will be explained later. During the reproducing mode, since the light spot 21a has the intensity which is substantially identical with the intensity of the other reproducing light spots 22a–22f, the above mentioned undesired return light beams are not produced.

A focusing error signal $F_0$ for performing the focus control of the objective lens 3 may be derived by processing output signals from the light receiving regions 25a–25d by the well known astigmatism method. Now it is assumed that the output signals from the light receiving regions 25a–25d are denoted by $I_{25a}$–$I_{25d}$. Then, the focus error signal $F_0$ can be derived by the following equation.

$$F_0 = (I_{25a} + I_{25c}) - (I_{25b} - I_{25d})$$

A tracking error signal $T_r$ can be derived by the three-beam method by processing output signals $I_{26a}$ and $I_{26b}$ from the light receiving sections 26a and 26b, respectively in accordance with the following equation.

$$T_r = I_{26a} - I_{26b}$$

Further, in the information recording mode, the recorded information is verified on the basis of the output signal from either one of the light receiving sections 27c and 27e depending upon the direction of the movement of the optical card 4 with respect to the light spots.

Figure 9:
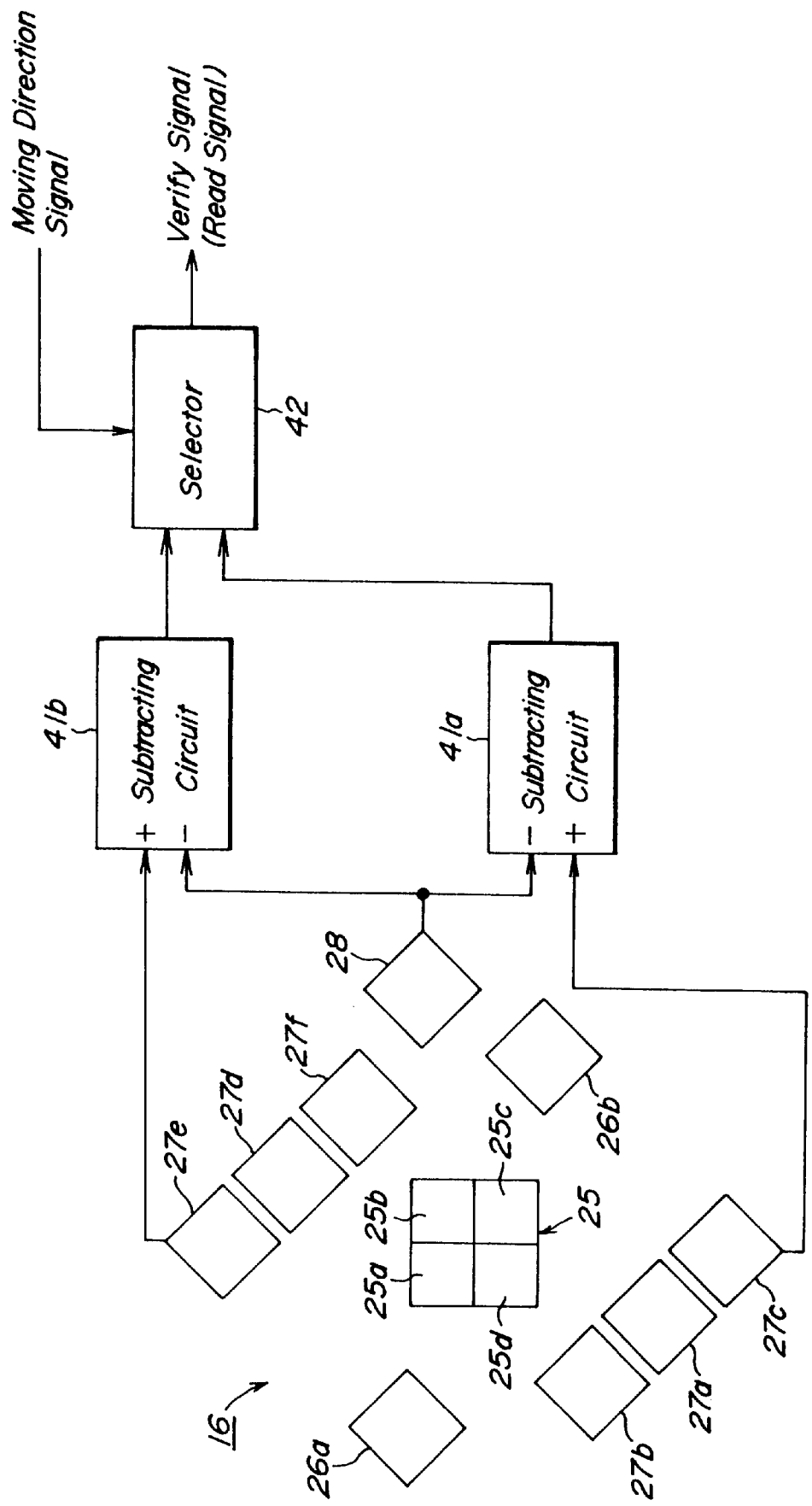
FIG. 9 is a block diagram showing an embodiment of the signal processing circuit for the light detector illustrated in FIG. 7.

FIG. 9 is a block diagram showing the signal processing circuit. The output signals from the light receiving sections 27c and 28 are supplied to a first subtracting circuit 41a to subtract the output signal of the section 28 from the output signal of the section 27c. Similarly, the output signals from the light receiving sections 27e and 28 are supplied to a second subtracting circuit 41b to subtract the output signal of the section 28 from the output signal of the section 27e. Output signals from the first and second subtracting circuits 41a and 41b are supplied to a selector 42, to which is also supplied a moving direction signal indicating the direction of the movement of the optical card 4. When the optical card 4 is moved downward in FIG. 6, the output signal from the first subtracting circuit 41a is selected by the selector 42 to derive the verify signal, i.e. read signal. When the optical card 4 is moved upward, the selector 42 selects the output signal from the second subtracting circuit 41b as the verify signal. It is preferable to make a surface area of the leak light receiving sections 28 identical with a surface area of the light receiving sections 27c and 27e. Then, in the subtracting circuits 41a and 41b, the output signals from the light receiving sections 28 and 27c, 27e can be calculated as they are, and thus the construction of the subtracting circuits can be simplified. However, according to the invention, these surface areas may be different from each other. In this case, subtracting ratios in the subtracting circuits 41a and 41b may be changed in accordance with a ratio of the surface areas.

In the information reproducing mode, the information recorded on adjacent five tracks can be reproduced simultaneously by processing the output signals from the light receiving sections 27a–27f. As explained above with reference to FIG. 6, the center track 4a is read by the light spots 22c and 22e and the read signal is obtained by selecting either one of the output signals from the light receiving sections 27c and 27e. In FIG. 9, either of the output signals from the first and second subtracting circuits 41a and 41b is selected by the selector 42 to derive the read signal for the central track 4a, because in the reproducing mode, any undesired reflection light is made incident upon the leak light receiving section 28.

Figure 10:
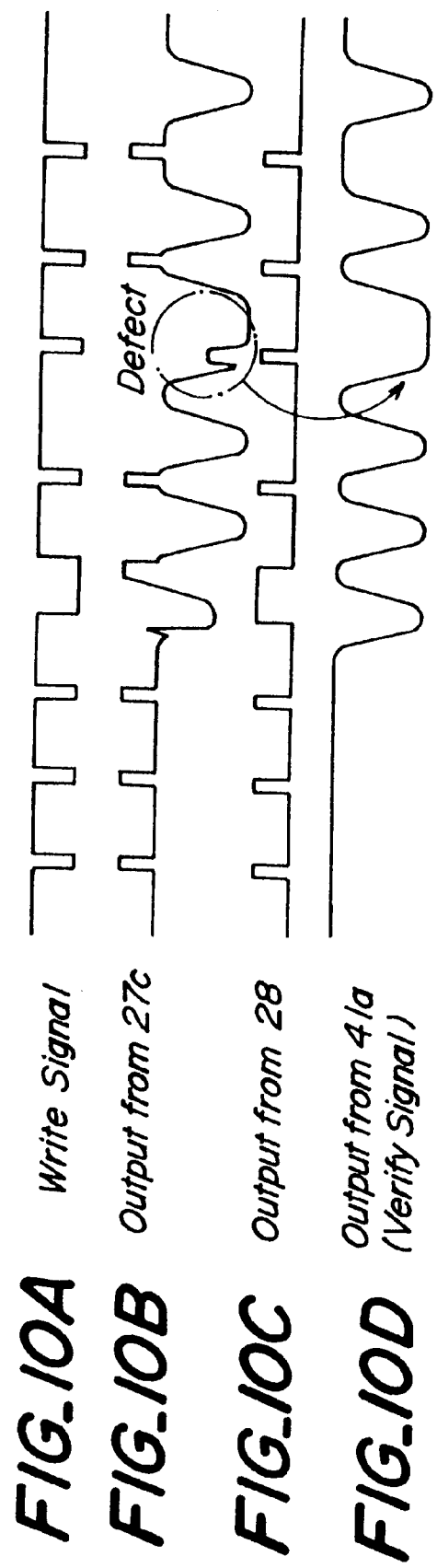
FIGS. 10A to 10D are signal waveforms explaining the operation of the signal processing circuit of FIG. 9.

As explained above, in the present embodiment, the leak light receiving section 28 is provided to receive only the undesired recording light beams reflected from the optical card 4 during the recording mode, and the verify signal is derived by correcting the output signals from the light receiving sections 27c and 27e on the basis of the output signal from the leak light receiving section 28. Therefore, although a defect 45 is existent on the track 4a of the optical card 4 as depicted in FIG. 6 and the defect is detected by the light receiving sections 27c and 27e at different time instances, the influence of the defect 45 appears only once in the verify signal as represented in FIGS. 10A–10D. FIG. 10A denotes a write signal to be recorded on the optical card 4, FIG. 10B the output signal from the light receiving section 27c, FIG. 10C the output signal from the light receiving section 28, and FIG. 10D represents the output signal from the first subtracting circuit 41a (verify signal). Therefore, the operation for verifying the recorded information can be performed correctly without increasing an error rate.

Figure 11:
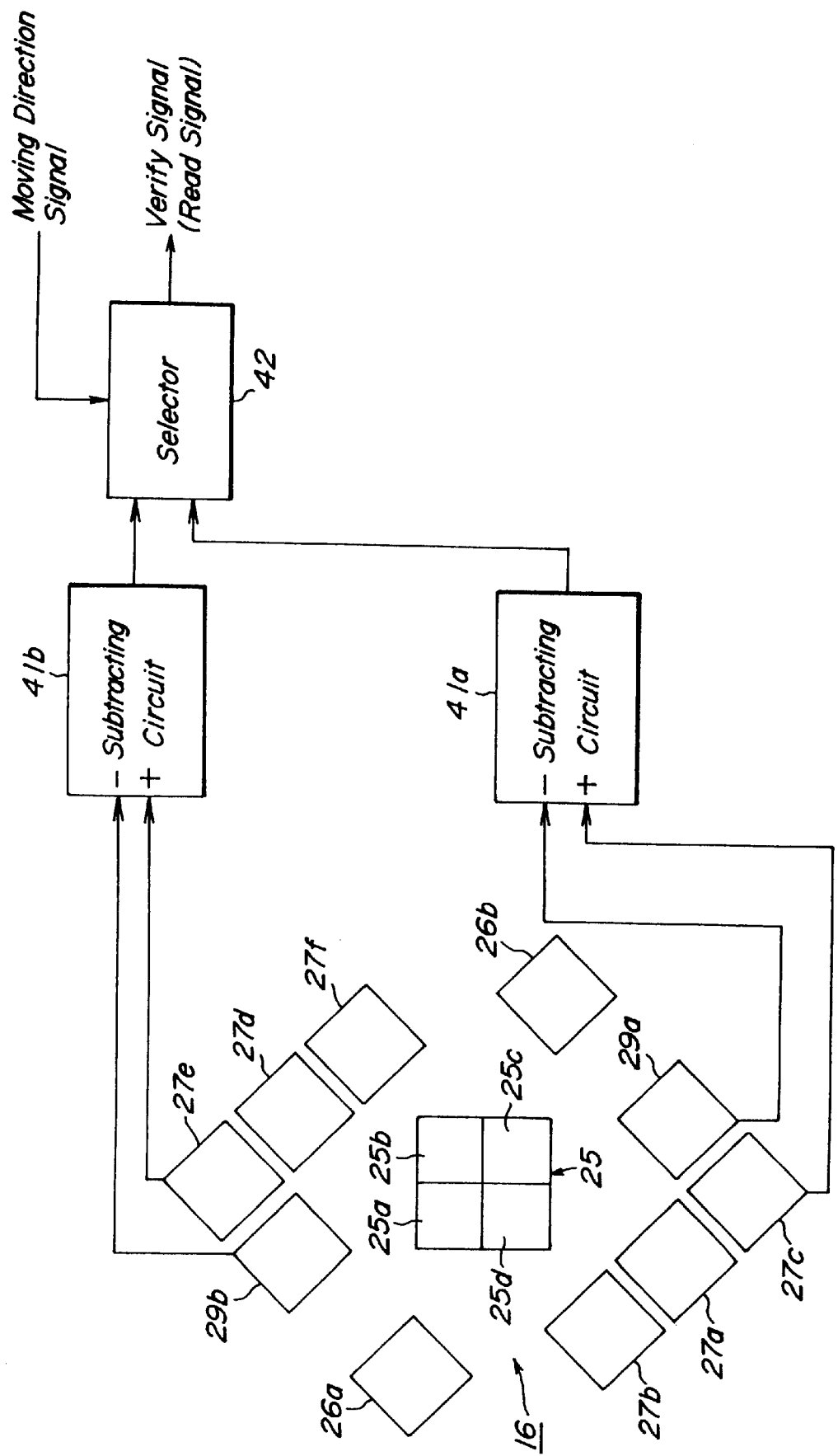
FIG. 11 is a schematic view representing a second embodiment of the apparatus according to the invention.

FIG. 11 is a block diagram showing photo-detector and signal processing circuit of a second embodiment of the optical information recording and reproducing apparatus according to the invention. In the present embodiment, leak light receiving sections 29a and 29b are provided in the vicinity of the light receiving sections 27c and 27e, respectively. The leak light receiving sections 29a and 29b are arranged at such positions that they receive the undesired recording light beam reflected by the optical card 4, but do not receive not only the return beam of the recording light spot 21a from the record layer of the optical card, but also any return beams of the tracking light spots 21b, 21c and verifying and reproducing light spots 22a–22f.

In the present embodiment, in the information recording mode, the recorded information is verified by using the output signals from the light receiving sections 27c, 29a or 27e and 29b depending upon the direction of the movement of the optical card 4. To this end, the output signals from the light receiving sections 27c and 29a are supplied to a first subtracting circuit 41a to derive a difference therebetween, and the output signals from the light receiving sections 27e and 29b are supplied to a second subtracting circuit 41b to derive a difference therebetween. The output signals from these subtracting circuits 41a and 41b are then supplied to a selector 42 to select either one of these output signals as the verify signal (read signal).

In the present embodiment, the leak light receiving section 29a is provided in the vicinity of the light receiving section 27c whose output signal is to be corrected by the output signal from the leak light receiving section 29a and the leak light receiving section 29b is provided in the vicinity of the light receiving section 27e whose output signal is to be corrected by the output signal from the leak light receiving section 29b. Therefore, even if the undesired recording light beam reflected by the optical card is not uniform, the leakage of the undesired light onto the light receiving sections 27c and 27e can be correctly accurately.

Figure 12:
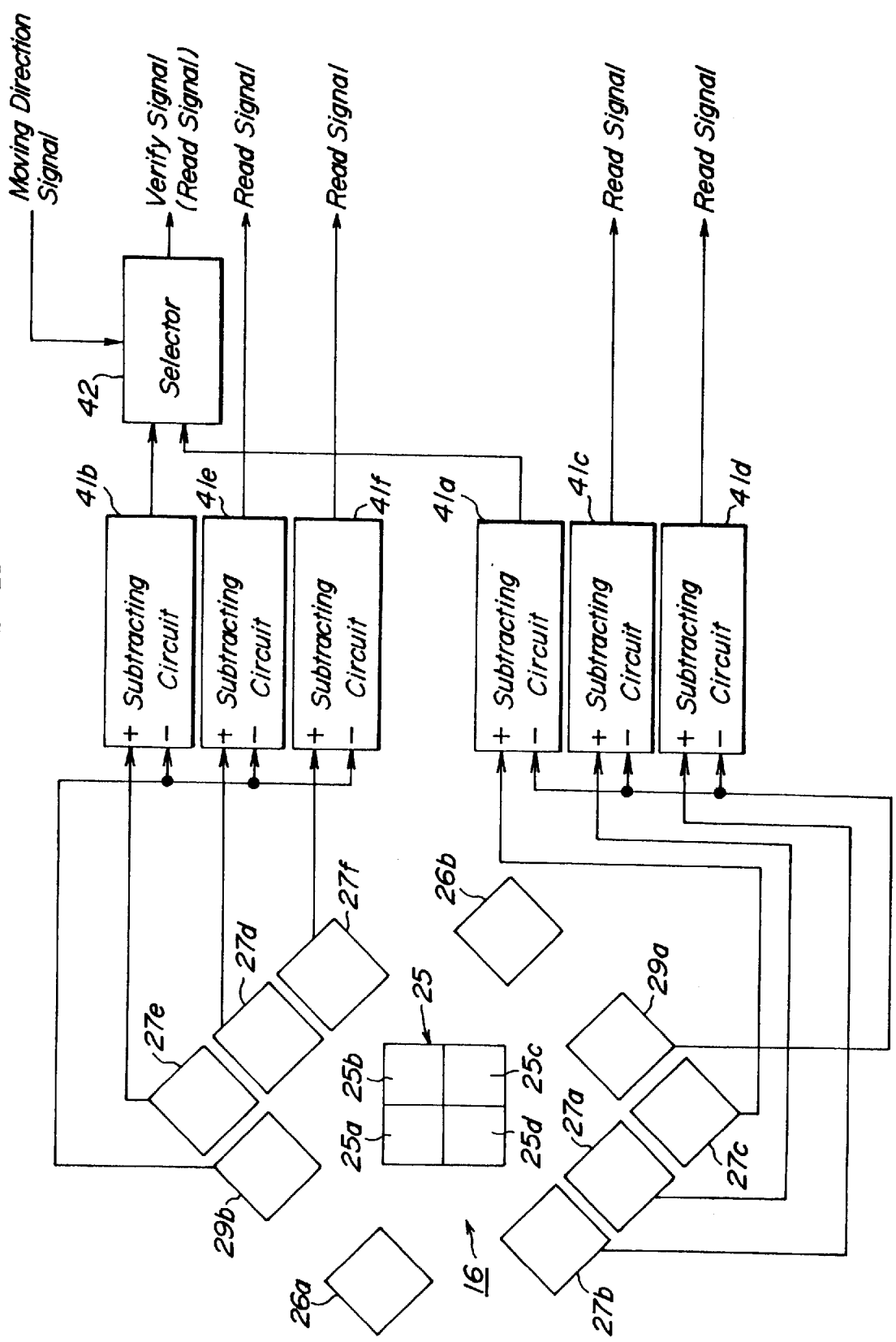
FIG. 12 is a schematic view showing a third embodiment of the apparatus according to the invention.

FIG. 12 is a block diagram illustrating the photo-detector and signal processing circuit of a third embodiment of the optical information recording and reproducing apparatus according to the invention. The photo-detector 16 has the same structure as that of the second embodiment shown in FIG. 11. In the present embodiment, the output signals from the light receiving sections 27a–27c are corrected by the output signal from the leak light receiving section 29a, and the output signals from the light receiving sections 27d–27f are corrected by the output signal from the leak light receiving section 29b. Therefore, in the information recording mode, the verifying operation for the track on which the recording light beam is made incident and the blank checking operation for tracks adjacent to said track.

To this end, in the present embodiment, the output signals from the light receiving sections 27a, 27b and 27c are supplied to positive input terminals of subtracting circuits 41c, 41d and 41a, respectively, and at the same time, the output signals from the light receiving sections 27d, 27e and 27f are supplied to positive input terminals of subtracting circuits 41e, 41b and 41f, respectively. The output signal from the light receiving section 29a is commonly supplied to negative input terminals of the subtracting circuit 41c, 49d and 41a, and the output signal of the light receiving section 29b is commonly supplied to negative input terminals of the subtracting circuits 41e, 41b and 41f.

In this manner, during the information recording mode, the verify signal for the track 4a on which the recording light beam is made incident can be derived by selecting either one of the output signals from the subtracting circuit 41a and 41b by means of a selector 42 in accordance with the moving direction signal. At the same time, the blank checking signals can be obtained from the subtracting circuits 41c–41f for the tracks on which the light spots 22a, 22b, 22d and 22f are irradiated. During the reproducing mode, the read signal for the track 4a on which the light spot 21a is projected can be obtained from the selector 42, and at the same time the read signals for the adjacent tracks on which the light spots 22a, 22b, 22d and 22f are projected can be derived from the subtracting circuits 41c–41f, respectively.

In the present embodiment, the output signals from the light receiving sections 27a–27c are corrected by the output signal from the leak light receiving section 29a arranged near the section 27a–27c and the output signals from the light receiving sections 27d–27f are corrected by the output signal from the leak light receiving section 29b provided near the section 27d–27f. Therefore, it is possible to obtain the verify signal without being affected by the non-uniform undesired recording light beams reflected by the optical card, and at the same time the accurate blank checking signals for the tracks on which the light spots 22a, 22b, 22d and 22f are formed can be obtained. Therefore, it is possible to increase an effective recording speed as described in a Japanese Patent Publication Kokai Hei No. 6-89434.

FIGS. 13 and 14 are plan views depicting another embodiments of the photo-detector 16 which may be utilized in the second and third embodiments. The photo-detector 16 shown in FIG. 13 an L-shaped leak light receiving section 29a is provided along adjacent two sides of the rectangular light receiving section 27c, and similarly an L-shaped leak light receiving section 29b is arranged along adjacent two sides of the rectangular light receiving section 27e. In this case, it is preferable to make a surface area of the leak light receiving section 29a identical with that of the section 27c and to make a surface area of the section 29b equal to that of the section 27c.

When the leak light receiving sections 29a and 29b are arranged in the vicinity of the light receiving sections 27c and 27e, respectively, the output signals from the sections 27c and 27e can be corrected much more accurately by the output signals from the leak light receiving sections 29a and 29b, respectively without being affected by the fact that the recording light beam might be reflected by the optical card non-uniformly.

In the photo-detector illustrated in FIG. 14, the leak light receiving section 29a is consisting of two elongated light receiving regions $29_{a1}$ and $29_{a2}$, and similarly the leak light receiving section 29b is formed by two elongated light receiving regions $29_{b1}$ and $29_{b2}$. The light receiving regions $29_{a1}$ and $29_{a2}$ are arranged on opposite sides of an array of the light receiving sections 27a–27c, and the light receiving regions $29_{b1}$ and $29_{b2}$ are arranged on opposite sides of an array of the light receiving sections 27d–27f. Output signals from the light receiving regions $29_{a1}$ and $29_{a2}$ are added to each other to derive a sum signal which is then supplied to the first subtracting circuit 41a, and similarly output signals from the light receiving regions $29_{b1}$ and $29_{b2}$ are added to each other to derive a sum signal which is then supplied to the second subtracting circuit 41b.It is preferable that a sum of surface areas of the light receiving regions $29_{a1}$ and $29_{a2}$ is made identical with a surface area of each of the light receiving sections 27a–27c and a sum of surface areas of the light receiving regions $29_{b1}$ and $29_{b2}$ is made equal to a surface area of each of the light receiving sections 27d–27f.

In the photo-detector 14 shown in FIG. 14, the leak light receiving section 29a can receive an average amount of undesired reflection light impinging upon the light receiving sections 27a–27c and similarly the leak light receiving section 29b can receive an average amount of undesired reflection light impinging upon the light receiving sections 27d–27f. Therefore, such a photo-detector 16 may be advantageously used in the third embodiment in which the output signals from the light receiving sections 27a–27c and 27d–27f are corrected by the output signals of the leak light receiving sections 29a and 29b, respectively.

The present invention is not limited to the embodiments explained above, but various alternations and modifications may be conceived by those skilled in the art within the scope of the invention. For instance, in the above embodiments, the focusing control and tracking control are performed by utilizing the recording light beam originated from the semiconductor laser 1, but the tracking control may be carried out by using the reproducing light beam originated from the semiconductor laser 2 by replacing diffraction grating 6 generating the three light beams into a position between the ½ wavelength plate 9 and the diffractive optical member 10, while the focusing control is performed by using the laser beam emitted by the semiconductor laser 1.

Moreover, in the above embodiments, the one-track write and multi-track read operation is carried out by using the two semiconductor lasers, but according to the invention, this may be performed by using a single semiconductor laser. It should be noted that the present invention may be equally applied to the one-track write and one-track read. Furthermore, the optical record medium is not limited to the optical card, but may be any other optical record medium such as optical disc.

As explained above, according to the invention, since the leak light receiving section is provided to receive only the undesired recording light beams reflected from the optical record medium and the output signal from the verifying light receiving section is corrected by the output signal from the leak light receiving section, the recorded information can be verified in an accurate and reliable manner on the basis of the corrected output signal from the verifying light receiving section without increasing the error rate due to defects on the optical record medium.

What is claimed is:

1. An apparatus for recording and reproducing optical information on and from an optical record medium of a multi-layer structure comprising:

a light projection means for projecting a recording light beam and at least one verifying light beam onto the optical record medium to form a recording light spot and at least one verifying light spot on the optical record medium;

a photo-detecting means including at least one verifying light receiving section for receiving said at least one verifying light beam reflected by the optical record medium and at least one leak light receiving section for receiving only undesired recording light beams reflected from the optical record medium; and a signal processing means for correcting an output signal from said verifying light receiving section on the basis of an output signal from said leak light receiving section.

2. An apparatus according to claim 1, wherein said leak light receiving section is provided in the vicinity of the verifying light receiving section.

3. An apparatus according to claim 2, wherein said light beam projection means further projects at least one reproducing light beam onto at least one track adjacent to the track on which the recording light beam is made incident, said photo-detecting means further includes at least one reproducing light receiving section which receives said at least one reproducing light beam reflected by the optical record medium, and said signal processing means is constructed to correct an output signal from the reproducing light receiving section on the basis of the output signal of the leak light receiving section.

4. An apparatus according to claim 3 for recording and reproducing optical information on and from an optical card having parallel tracks, wherein said light projection means projects first and second verifying light beams on a same track of the optical card on which said recording light beam is made incident at positions situating on opposite sides of the recording light spot viewed in a direction of the tracks, said photo-detecting means includes first and second verifying light receiving sections receiving the first and second verifying light beams, respectively reflected by the optical card, and said signal processing means includes first and second subtracting circuits for subtracting the output signal from said leak light receiving section from output signals from said first and second light receiving sections to derive first and second verify signals, respectfully and a selector for selecting either one of the first and second verify signals in accordance with a signal denoting a direction of a movement of the optical card with respect to the light spots.

5. An apparatus according to claim 4, wherein said photo-detecting means comprises first and second leak light receiving sections which are arranged in the vicinity of said first and second verifying light receiving sections, respectively, and output signals from said first and second leak light receiving sections are supplied to said first and second subtracting circuits, respectively.

6. An apparatus according to claim 5, wherein said first and second leak light receiving sections are formed to have same shape and size as those of said first and second verifying light receiving sections.

7. An apparatus according to claim 5, wherein each of said first and second verifying light receiving sections is formed to have a rectangular shape and each of said first and second leak light receiving sections is formed to have an L-shape extending along adjacent sides of the rectangular shape of the first and second verifying light receiving sections.

8. An apparatus according to claim 5, wherein each of said first and second verifying light receiving sections is formed to have a rectangular shape and each of said first and second leak light receiving sections is formed by two elongated light receiving regions arranged on opposite sides of each of the rectangular first and second verifying light receiving sections.

9. An apparatus according to claim 1, wherein said verifying light receiving section has a surface area which is substantially identical with a surface area of said leak light receiving section.

10. An apparatus according to claim 9, wherein said light beam projection means further projects at least one reproducing light beam onto at least one track adjacent to the track on which the recording light beam is made incident, said photo-detecting means further includes at least one reproducing light receiving section which receives said at least one reproducing light beam reflected by the optical record medium, and said signal processing means is constructed to correct an output signal from the reproducing light receiving section on the basis of the output signal of the leak light receiving section.

11. An apparatus according to claim 10 for recording and reproducing optical information on and from an optical card having parallel tracks, wherein said light projection means projects first and second verifying light beams on a same track of the optical card on which said recording light beam is made incident at positions situating on opposite sides of the recording light spot viewed in a direction of the tracks, said photo-detecting means includes first and second verifying light receiving sections receiving the first and second verifying light beams, respectively reflected by the optical card, and said signal processing means includes first and second subtracting circuits for subtracting the output signal from said leak light receiving section from output signals from said first and second light receiving sections to derive first and second verify signals, respectively and a selector for selecting either one of the first and second verify signals in accordance with a signal denoting a direction of a movement of the optical card with respect to the light spots.

12. An apparatus according to claim 11, wherein said photo-detecting means comprises first and second leak light receiving sections which are arranged in the vicinity of said first and second verifying light receiving sections, respectively, and output signals from said first and second leak light receiving sections are supplied to said first and second subtracting circuits, respectively.

13. An apparatus according to claim 12, wherein said first and second leak light receiving sections are formed to have same shape and size as those of said first and second verifying light receiving sections.

14. An apparatus according to claim 12, wherein each of said first and second verifying light receiving sections is formed to have a rectangular shape and each of said first and second leak light receiving sections is formed to have an L-shape extending along adjacent sides of the rectangular shape of the first and second verifying light receiving sections.

15. An apparatus according to claim 12, wherein each of said first and second verifying light receiving sections is formed to have a rectangular shape and each of said first and second leak light receiving sections is formed by two elongated light receiving regions arranged on opposite sides of each of the rectangular first and second verifying light receiving sections.

16. An apparatus according to claim 1, wherein said light beam projection means further projects at least one reproducing light beam onto at least one track adjacent to the track on which the recording light beam is made incident, said photo-detecting means further includes at least one reproducing light receiving section which receives said at least one reproducing light beam reflected by the optical record medium, and said signal processing means is constructed to correct an output signal from the reproducing light receiving section on the basis of the output signal of the leak light receiving section.

17. An apparatus according to claim 16 for recording and reproducing optical information on and from an optical card having parallel tracks, wherein said light projection means projects first and second verifying light beams on a same track of the optical card on which said recording light beam is made incident at positions situating on opposite sides of the recording light spot viewed in a direction of the tracks, said photo-detecting means includes first and second verifying light receiving sections receiving the first and second verifying light beams, respectively reflected by the optical card, and said signal processing means includes first and second subtracting circuits for subtracting the output signal from said leak light receiving section from output signals from said first and second light receiving sections to derive first and second verify signals, respectively and a selector for selecting either one of the first and second verify signals in accordance with a signal denoting a direction of a movement of the optical card with respect to the light spots.

18. An apparatus according to claim 17, wherein said photo-detecting means comprises first and second leak light receiving sections which are arranged in the vicinity of said first and second verifying light receiving sections, respectively, and output signals from said first and second leak light receiving sections are supplied to said first and second subtracting circuits, respectively.

19. An apparatus according to claim 18, wherein said first and second leak light receiving sections are formed to have same shape and size as those of said first and second verifying light receiving sections.

20. An apparatus according to claim 18, wherein each of said first and second verifying light receiving sections is formed to have a rectangular shape and each of said first and second leak light receiving sections is formed to have an L-shape extending along adjacent sides of the rectangular shape of the first and second verifying light receiving sections.

21. An apparatus according to claim 18, wherein each of said first and second verifying light receiving sections is formed to have a rectangular shape and each of said first and second leak light receiving sections is formed by two elongated light receiving regions arranged on opposite sides of each of the rectangular first and second verifying light receiving sections.

* * * * *